(12) United States Patent
Blachinsky et al.

(10) Patent No.: US 11,820,453 B2
(45) Date of Patent: Nov. 21, 2023

(54) COMPOSITE FENDER FOR ELECTRIC VEHICLE

(71) Applicant: Future Motion, Inc., Santa Cruz, CA (US)

(72) Inventors: Daniel Blachinsky, Squamish (CA); Kyle Jonathan Doerksen, Santa Cruz, CA (US); Julian De La Rua, Santa Cruz, CA (US)

(73) Assignee: Future Motion, Inc., Santa Cruz, CA (US)

( * ) Notice: Subject to any disclaimer, the term of this patent is extended or adjusted under 35 U.S.C. 154(b) by 0 days.

(21) Appl. No.: 17/839,297

(22) Filed: Jun. 13, 2022

(65) Prior Publication Data

US 2022/0396329 A1 Dec. 15, 2022

Related U.S. Application Data

(60) Provisional application No. 63/209,812, filed on Jun. 11, 2021.

(51) Int. Cl.
| | |
|---|---|
| *B62J 15/04* | (2006.01) |
| *A63C 17/12* | (2006.01) |
| *B62J 15/02* | (2006.01) |

(52) U.S. Cl.
CPC ............... *B62J 15/04* (2013.01); *A63C 17/12* (2013.01); *B62J 15/02* (2013.01)

(58) Field of Classification Search
CPC ............ B62J 15/04; A63C 17/12; A63C 17/08
See application file for complete search history.

(56) References Cited

U.S. PATENT DOCUMENTS

| 4,106,786 | A | * | 8/1978 | Talbott | A63C 17/01 |
| | | | | | 280/8 |
| D843,532 | S | | 3/2019 | Doerksen | |
| 10,456,658 | B1 | | 10/2019 | Doerksen | |
| 11,123,629 | B1 | * | 9/2021 | Doerksen | B62K 1/00 |
| 11,273,364 | B1 | * | 3/2022 | Doerksen | A63C 17/12 |
| 11,325,021 | B1 | * | 5/2022 | McCosker | A63C 17/12 |
| 2021/0023437 | A1 | * | 1/2021 | Woolson | A63C 17/262 |

\* cited by examiner

*Primary Examiner* — Brian L Swenson
(74) *Attorney, Agent, or Firm* — Kolitch Romano Dascenzo Gates LLC

(57) ABSTRACT

Fender assemblies are disclosed, each including a rectangular frame defining a central aperture. The perimeter of the central aperture may have a rounded-rectangle shape. A fender arch in the form of an arcuate sheet, e.g., of carbon fiber (CF), terminates on either end at respective first and second flanges extending outward to form a planar base. The arcuate sheet extends through the central aperture to reach above a top side of the frame and the flanges abut a bottom side of the frame. A mud guard is coupled to the rectangular frame through the first flange of the arcuate sheet, such that the mud guard extends from the first flange away from the second side of the frame. The frame and mud guard may be made of plastic, and may be configured to absorb assembly forces to avoid damaging the CF fender arch.

20 Claims, 14 Drawing Sheets

COMPOSITE FENDER FOR ELECTRIC VEHICLE

CROSS-REFERENCES

The following applications and materials are incorporated herein, in their entireties, for all purposes: U.S. Provisional Patent Application Ser. No. 63/209,812, filed Jun. 11, 2021; and U.S. Pat. No. 10,456,658, granted Oct. 29, 2019.

FIELD

This disclosure relates to fenders for electric vehicles. More specifically, the disclosed embodiments relate to fender assemblies for one-wheeled, self-stabilizing skateboards.

SUMMARY

The present disclosure provides systems, apparatuses, and methods relating to an improved fender assembly for a one-wheeled skateboard or similar vehicle.

In some examples, a fender assembly for a one-wheeled vehicle includes: a rectangular frame defining a central aperture, wherein a perimeter of the central aperture has a rounded-rectangle shape; an arcuate sheet terminating on either end at respective first and second flanges extending outward to form a planar base, wherein the arcuate sheet extends through the central aperture to a first side of the frame and the flanges abut a second side of the frame; and a mud guard coupled to the rectangular frame through the first flange of the arcuate sheet, such that the mud guard extends from the first flange away from the second side of the frame.

In some examples, a fender assembly for a one-wheeled vehicle includes: an arch portion comprising a curved sheet of carbon fiber composite (CF) material having two opposing end portions, each end portion of the sheet extending outward to form a first and a second pair of corner flanges, such that the two pairs of corner flanges are coplanar; a peripheral frame comprising a ring of plastic defining an inner aperture and having four corner portions, wherein the peripheral frame is mated with the arch portion, such that the curved sheet passes through the inner aperture and each of the four corner portions of the peripheral frame is disposed atop a corresponding one of the corner flanges of the arch portion; a mud guard comprising a plastic skirt extending downward from one end of the peripheral frame, the mud guard having a pair of mounting surfaces; and a plurality of first fasteners securing the mounting surfaces of the mud guard to the corresponding corner portions of the peripheral frame, such that the first pair of corner flanges of the CF material arch portion are sandwiched between the mounting surfaces and the peripheral frame.

Features, functions, and advantages may be achieved independently in various embodiments of the present disclosure, or may be combined in yet other embodiments, further details of which can be seen with reference to the following description and drawings.

DETAILED DESCRIPTION

Figure 1:
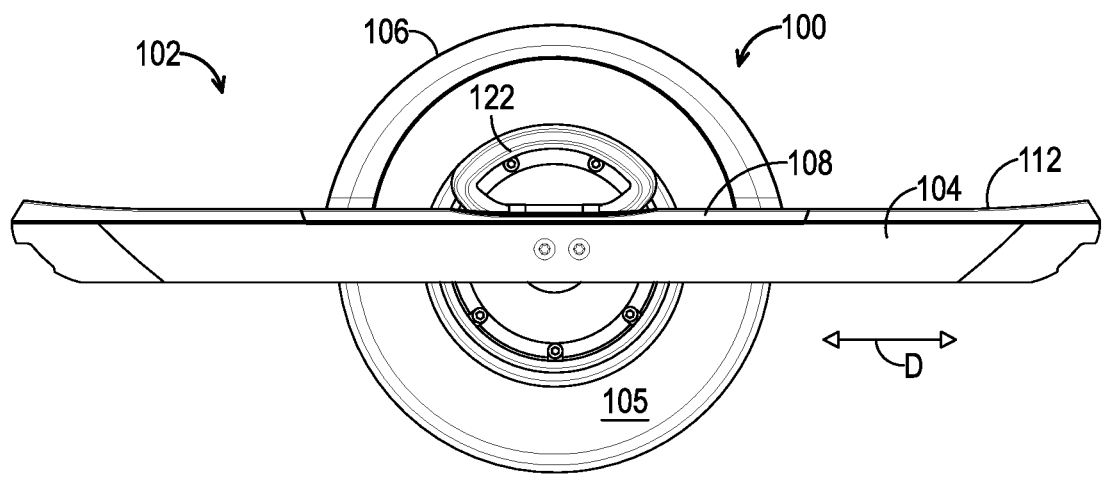
FIG. 1 is a side view of an illustrative one-wheeled electric skateboard having a fender in accordance with aspects of the present disclosure.

Various aspects and examples of a fender assembly for use with one-wheeled skateboards (and similar vehicles), as well as related methods, are described below and illustrated in the associated drawings. Unless otherwise specified, a fender assembly in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

The terms "inboard," "outboard," "forward," "rearward," and the like are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "rearward" means toward the rear of the vehicle. In the absence of a host vehicle, the same directional terms may be used as if the vehicle were present. For example, even when viewed in isolation, a device may have a "forward" edge, based on the fact that the device would be installed with the edge in question facing in the direction of the front portion of the host vehicle.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a fender assembly in accordance with the present teachings may include multiple elements coupled together, such that the assembly is removably attachable to a one-wheeled skateboard (or similar vehicle). Examples of such vehicles are disclosed in U.S. Pat. No. 10,456,658.

Within the fender assembly, at least an arch portion (configured to partially cover the wheel of the vehicle) may comprise a composite material, such as a carbon fiber composite, carbon fiber reinforced polymer, or the like (AKA "CF" or "carbon fiber" for short).

The multi-part assembly allows easier formation of small details such as attachment features and a mudguard by having those portions be made of one or more plastics (e.g., via injection molding). Meanwhile, the main arch portion of the assembly may be made of a carbon fiber material. Very tight dimensional tolerances are possible in the plastic parts at low cost. Moreover, parts expected to experience higher impact or wear may be made of plastic to have a higher impact resistance or toughness, while the main arch of the fender may have the low weight and high overall strength of carbon fiber construction.

Examples, Components, and Alternatives

The following sections describe selected aspects of illustrative fender assemblies, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Fender Assembly

As shown in FIGS. 1-17, the following section describes selected aspects of illustrative fender assemblies, as well as related systems and/or methods. The examples below are intended for illustration and should not be interpreted as limiting the scope of the present disclosure.

FIG. 1 depicts an illustrative fender assembly 100 installed on an example of a one-wheeled vehicle 102. As depicted in FIG. 1, the fender assembly is coupled to a body 104 (AKA frame) of the vehicle, and is configured to prevent mud and other debris leaving a tire 105 from reaching the rider and/or any nearby persons or objects.

Figure 2:
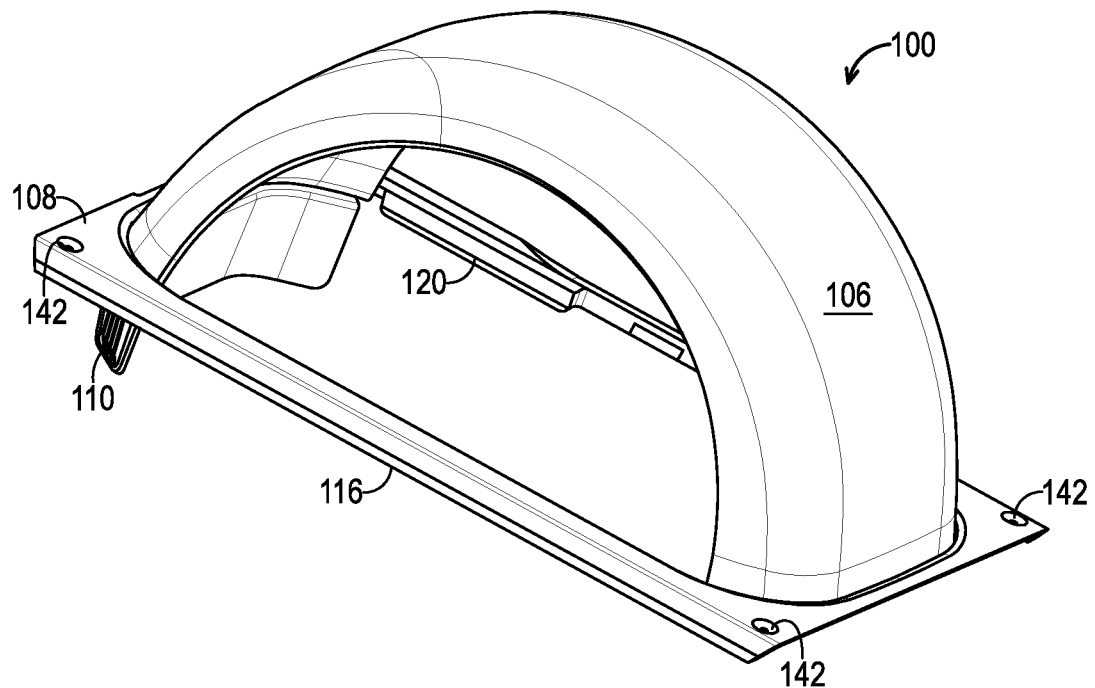
FIG. 2 is an isometric view of an illustrative fender according to the present teachings.
Figure 3:
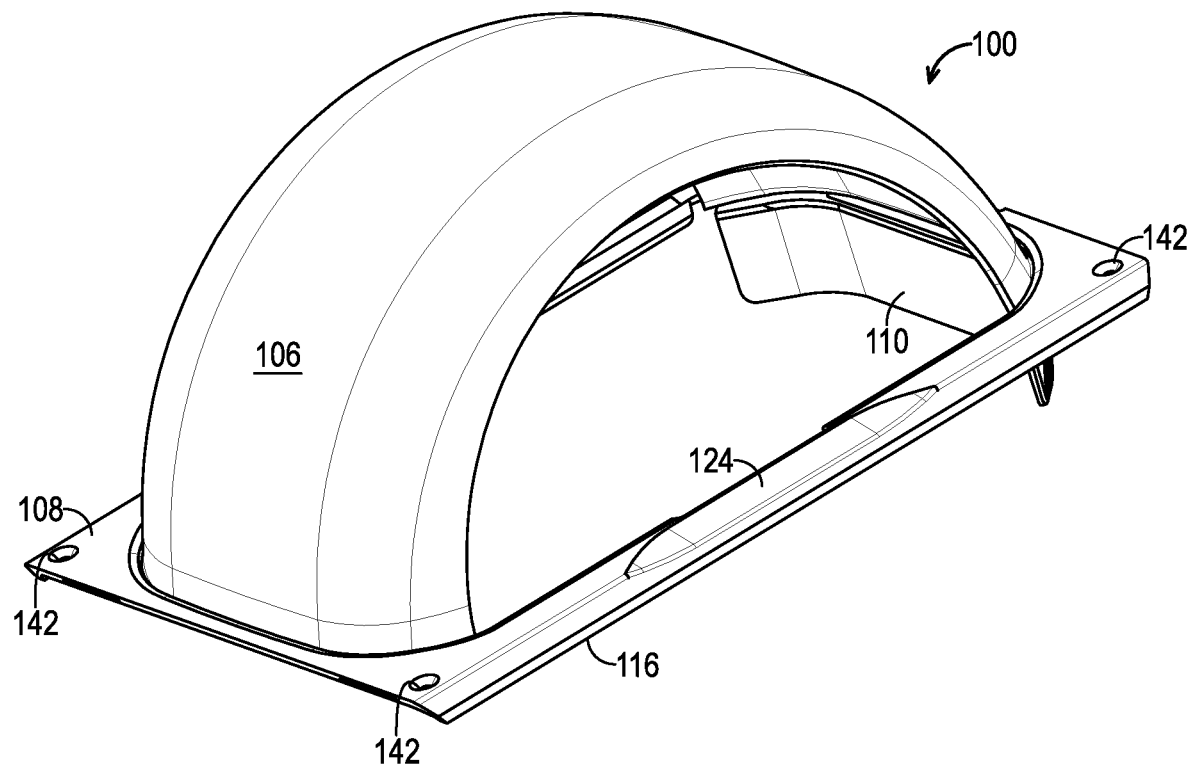
FIG. 3 is another isometric view of the fender of FIG. 2.
Figure 4:
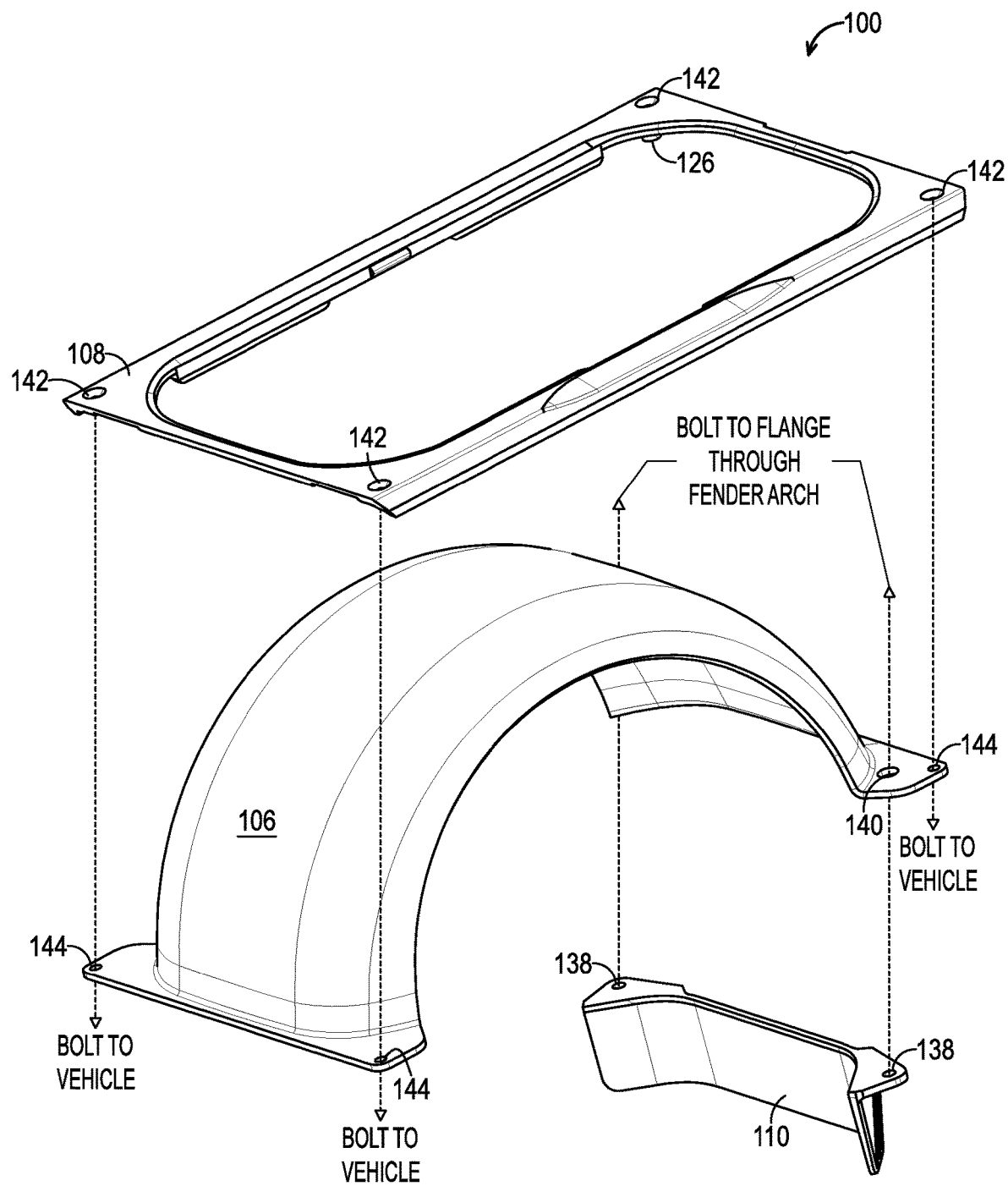
FIG. 4 is an isometric, exploded view of the fender of FIG. 2.
Figure 5:
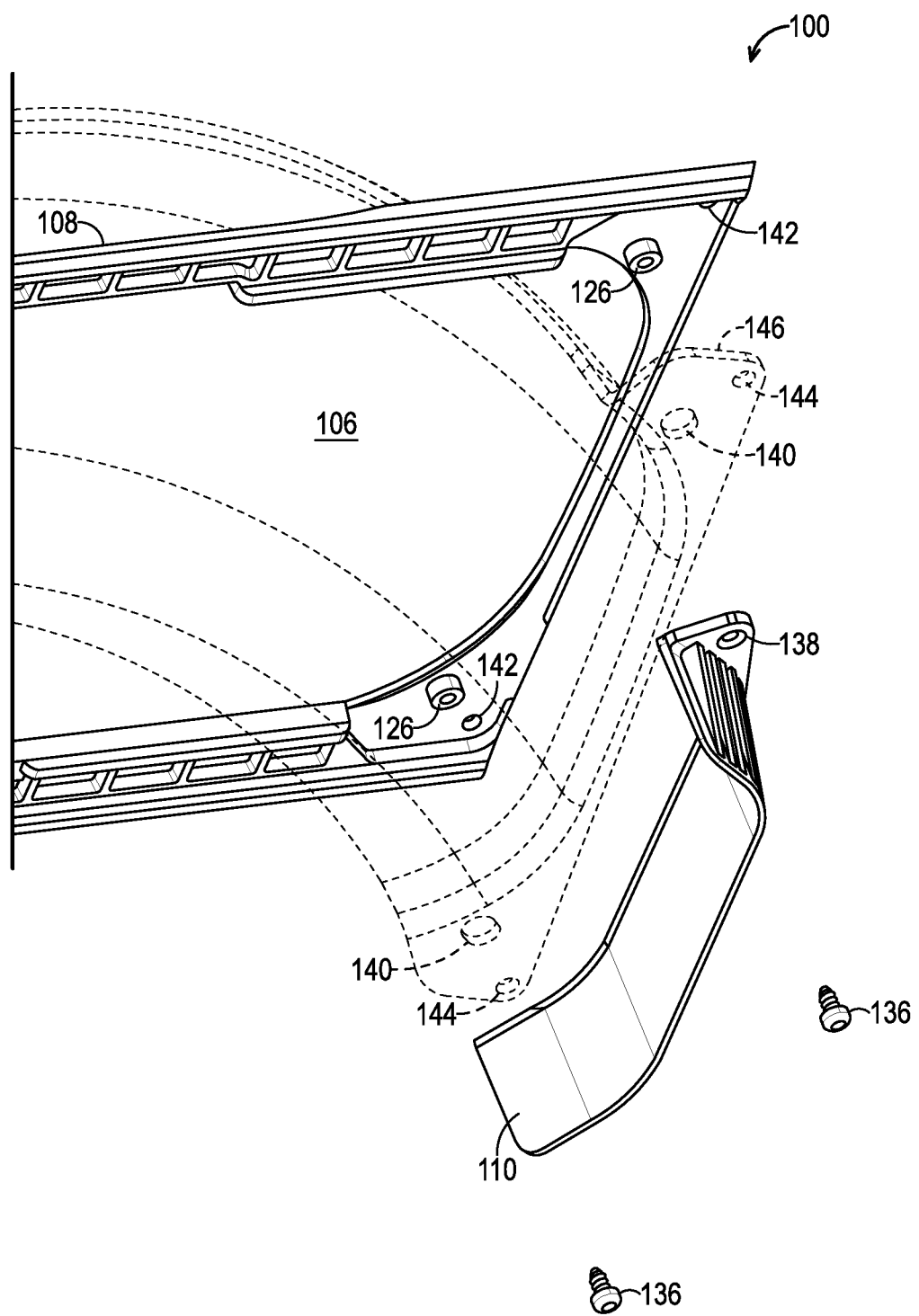
FIG. 5 is a partial isometric, exploded view of the fender of FIG. 2, taken from a bottom perspective.
Figure 6:
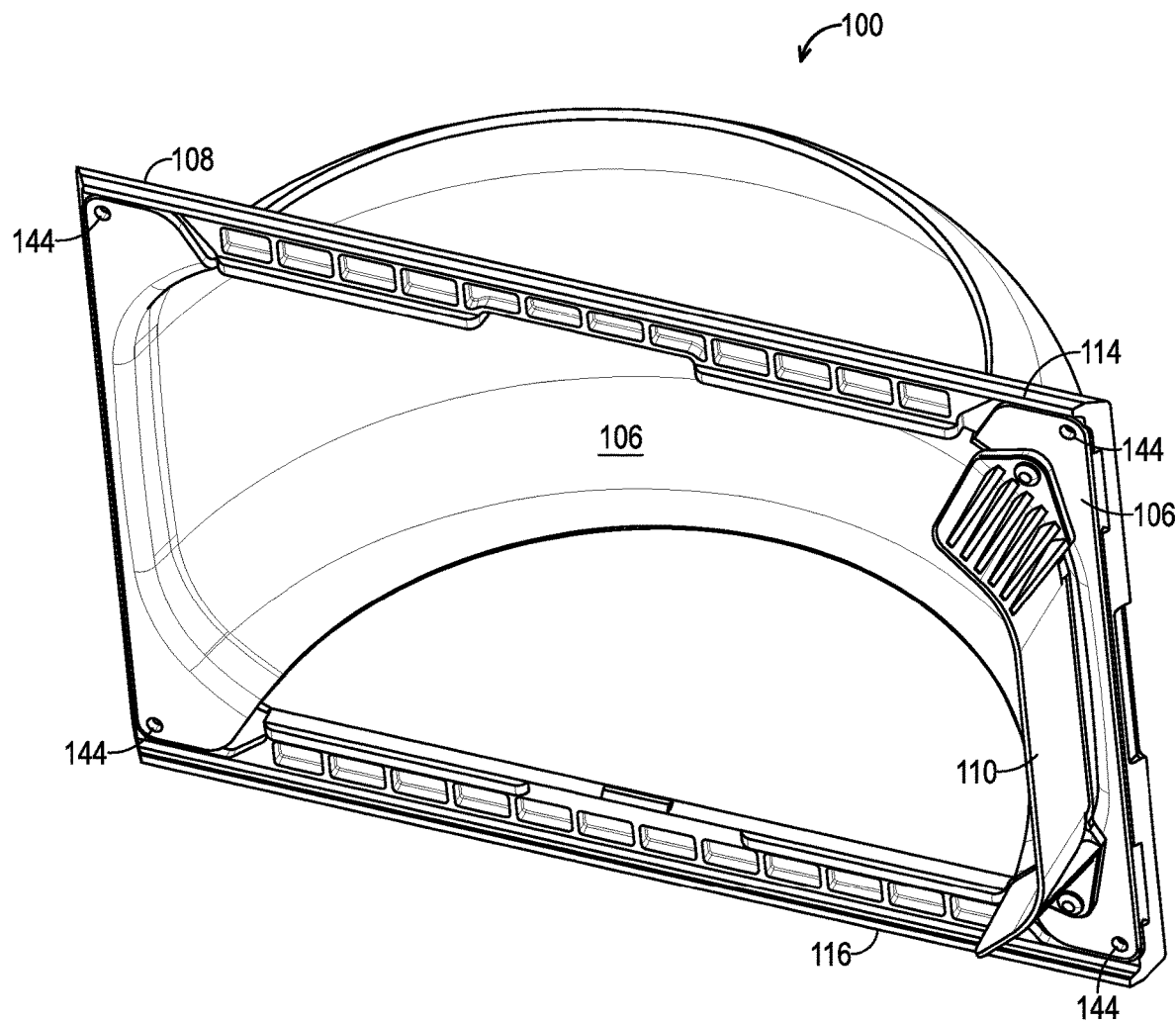
FIG. 6 is a bottom perspective, isometric view of the fender of FIG. 2.
Figure 17:
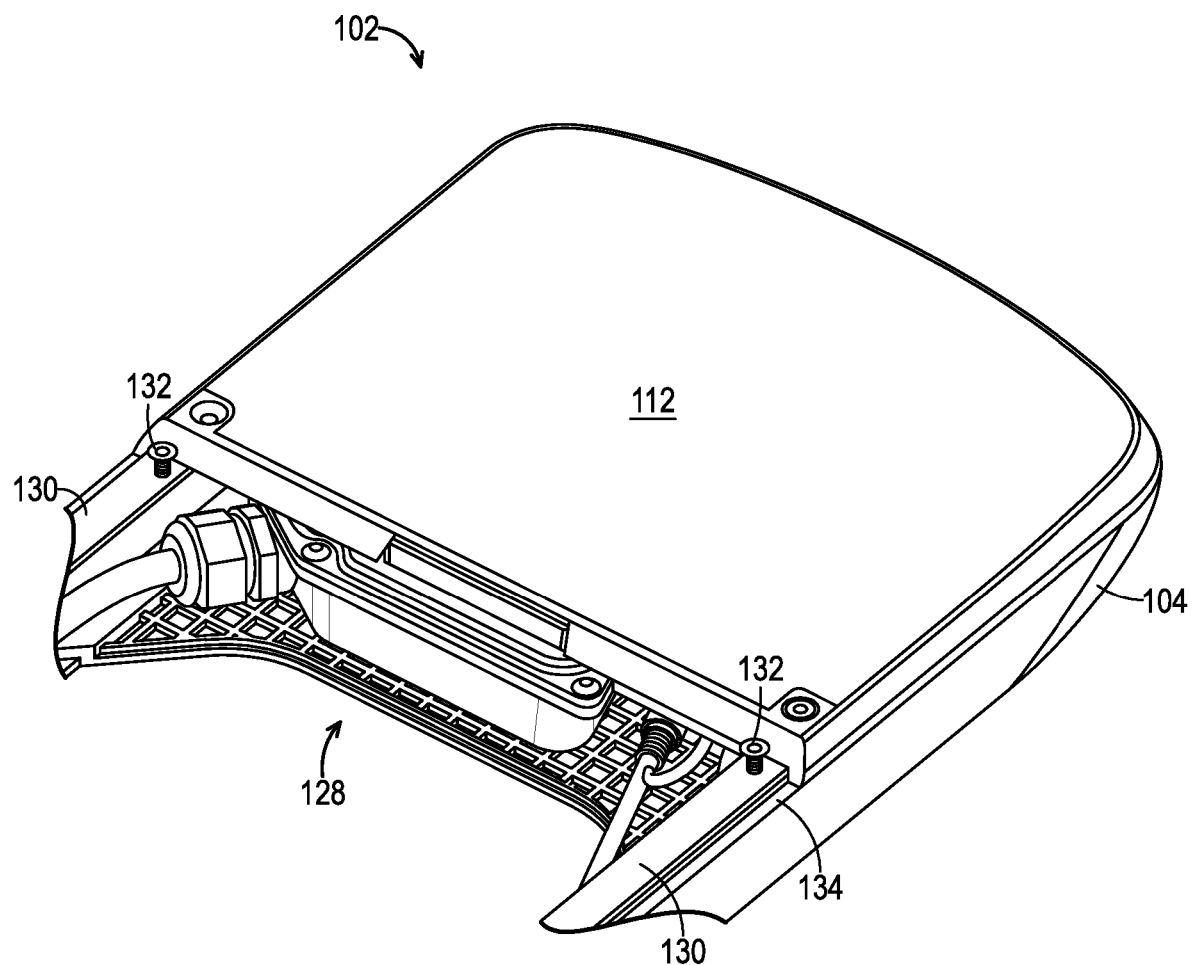
FIG. 17 is a partial oblique view of an end portion of the skateboard of FIG. 1.

FIGS. 2 and 3 are isometric views of fender assembly 100. FIGS. 4 and 5 are isometric, exploded views of the fender assembly. FIGS. 6-16 are various views of the fender assembly, and FIG. 17 depicts an end portion of the skateboard of FIG. 1, showing where the mud guard and peripheral frame are coupled.

With continuing reference to FIGS. 1-17, fender assembly 100 includes three separate sections: a fender arch or arch portion 106, a peripheral frame 108 (AKA a peripheral flange), and a skirt portion or mud guard 110, all of which are coupled to each other in the manner described below. In general, arch portion 106 and peripheral frame 108 are coupled together such that the arch portion spans from one end of the flange to the other in a fore-and-aft direction D (with respect to vehicle travel). Accordingly, arch portion 106 is configured to overarch tire 105 from front to rear. Arch portion 106 includes downward-curved lateral edges, such that the arch portion partially follows the side contours of the tire.

Mud guard 110 extends downward from peripheral frame 108 at one end of the arch portion. As depicted in FIG. 17, an inner end 128 of a deck portion 112 of vehicle 102 may be open or uncovered. This opening is covered or substantially sealed (and interior vehicle components are protected) by mud guard 110 of fender assembly 100.

Peripheral frame 108 (also referred to as a rectangular frame) includes a generally rectangular, generally planar, ring-like frame defining a central aperture (AKA inner aperture or central opening), such that wheel or tire 105 is disposed within the aperture when the fender assembly is installed. Peripheral frame 108 may generally comprise a rectangular annulus, although an inner and/or outer edge of the annulus may have rounded corners. For example, a perimeter of the central aperture may have a rounded-rectangle shape.

Peripheral frame 108 is configured to be seated onto a top surface 130 of body 104 of the vehicle (e.g., a top surface of a siderail or frame member), and be coupled thereto, e.g., by fasteners such as screws or bolts 132 through apertures 142 in corner areas of the peripheral frame. The peripheral frame may be described as a ring of plastic defining an inner aperture and having four corner portions. As the arch portion and mud guard are configured to be attached to frame 108 prior to installation on the vehicle, attaching peripheral frame 108 may include attaching an entirety of fender assembly 100 to the vehicle.

A lower ridge 114, 116 extends along each lateral edge of the peripheral frame, and is configured to interface with an outer edge feature 134 (e.g., a groove) of the underlying vehicle body. In some examples, ridges 114 and 116 are configured to absorb forces associated with coupling the peripheral flange to the vehicle, for example acting as a standoff or spacer. In some examples, inner protrusions 118, 120 of frame 108 are configured to mate with a corresponding channel in the vehicle, e.g., in a snap-into-place manner.

In some examples, such as when the vehicle has a pivotable handle 122: On the side corresponding to the side where handle 122 of the vehicle is mounted, a beveled edge 124 is provided in an inboard side of frame 108, to facilitate placement of the handle into a carrying position.

Arch portion 106 includes two feet including four corner flanges 146 (see, e.g., FIG. 5), each of which has an aperture 144 configured to align with a respective one of apertures 142 when peripheral frame 108 is installed onto the arch portion by receiving the arch of the arch portion within the central aperture of the flange. Accordingly, arch portion 106 includes a curved or arcuate sheet terminating on either end at respective first and second flanges extending outward to form a planar base. These flanges may be described as the arch having two opposing end portions, each end portion extending outward to form pairs of corner flanges, such that the two pairs of corner flanges are coplanar. As mentioned above, apertures 142 in the corners of the peripheral frame register with apertures 144 in the corners of the arch portion. In some examples, apertures 142 are beveled and/or countersunk to accommodate heads of fasteners 132. In some examples, apertures 144 in arch portion 106 are through-holes.

The fender assembly is configured to cover and protect the body of the vehicle, to manage the gap around the tire (e.g., for safety and aesthetics), and to provide additional protection from water/mud ingress into internal components such as a motor controller through open inner end 128 of deck portion 112.

With specific reference to FIGS. 4 and 5, which are exploded views of the fender assembly, mud guard 110 is configured to fasten onto the assembly from below. One or more fasteners 136 (bolts, screws, etc.) pass through aligned apertures in mud guard 110 (apertures 138) and arch portion 106 (apertures 140), respectively, and into respective bosses 126 on an underside of peripheral frame 108. In some examples, each aperture 140 is sized to receive the outer diameter of the corresponding boss 126. This assembly system securely couples all three of the components together into a cohesive assembly.

In some examples, arch portion 106 comprises a composite material, such as a carbon fiber composite, carbon fiber reinforced polymer, or the like (AKA "CF" or "carbon fiber"). In contrast, peripheral frame 108 and mud guard 110 may comprise plastic (e.g., injection-molded plastic) and/or any other suitable material configured to provide structural support and protection as described herein. Accordingly, construction of the fender assembly is configured to prevent damage to the CF structures. This is accomplished by ensuring all bolt head interfaces and threaded apertures are disposed in non-CF materials, and by ensuring the forces resulting from fasteners are absorbed by non-CF structures.

Specifically, when assembled together, mud guard 110 of fender assembly 100 is fastened to peripheral frame 108 by bolts or screws 136 received into aperture 138 of the mud guard and screwed into the threaded hole of boss 126 in a lower surface of the peripheral frame. Boss 126 is disposed in through-hole 140 of the CF arch portion, such that the arch portion is sandwiched between the mud guard and the peripheral frame without applying excessive force on the CF material. In other words, tightening each fastener 136 applies force to the mud guard and the peripheral frame, but not to the corner flange of the arch portion.

Similarly, fender assembly 100 is fastened to top surface 130 of vehicle 102 by securing fasteners 132 into threaded holes in the vehicle body, through holes 142 in peripheral frame 108 aligned or registered with holes 144 in corner flange 146 of the arch portion. In this manner, the force applied by tightening each fastener 132 is distributed over an area of the CF material of corner flange 146, which is sandwiched between peripheral frame 108 and the top surface of the body of the vehicle. In some examples, forces on the CF material are further limited in this sandwiching arrangement by ridges 114 and 116, which act as spacers to create a gap or space for the CF material between the peripheral frame and top surface 130.

Figure 7:
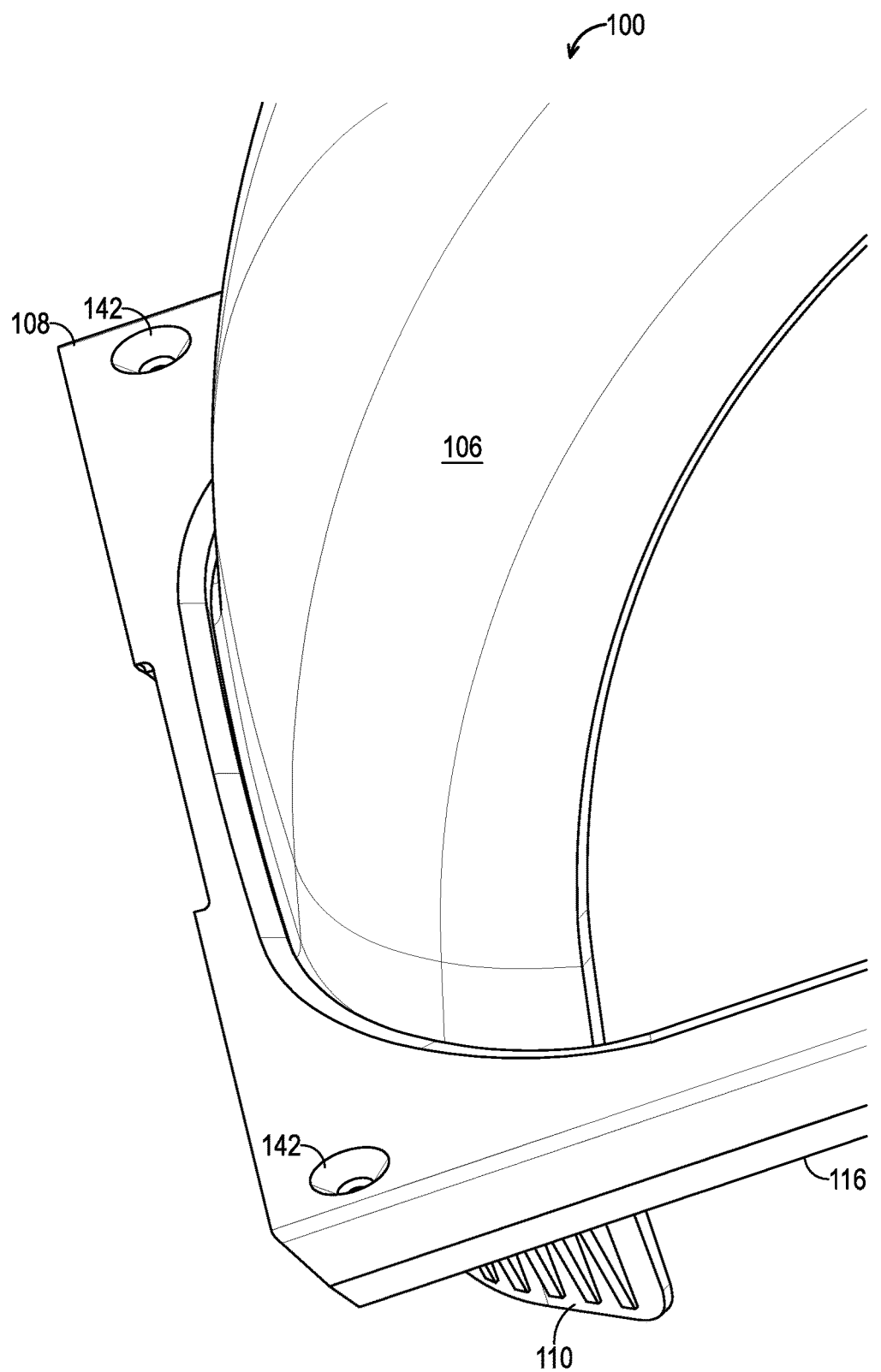
FIG. 7 is a partial, magnified view of a first end of the fender of FIG. 2.
Figure 8:
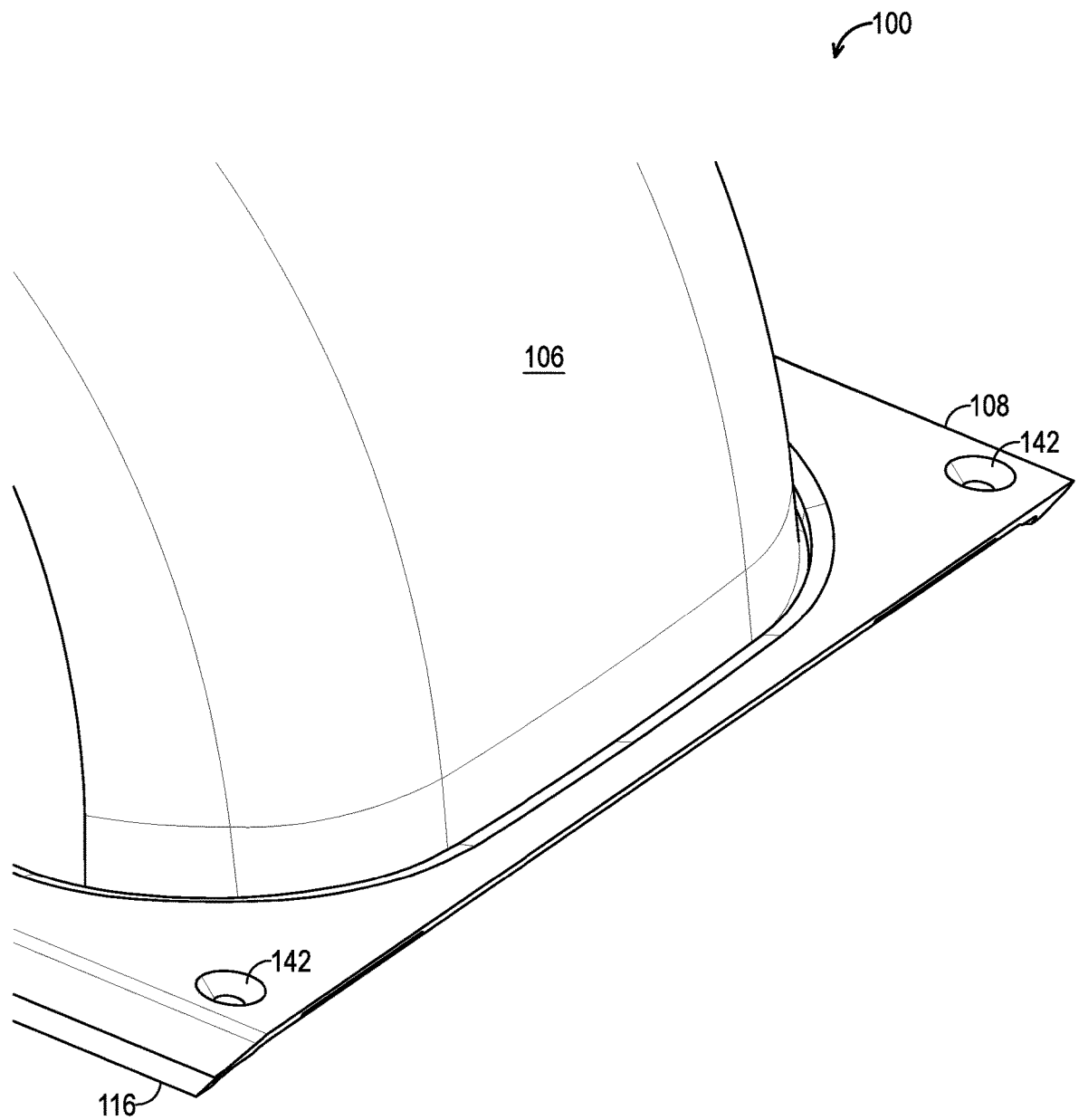
FIG. 8 is a partial, magnified view of a second end of the fender of FIG. 2.
Figure 9:
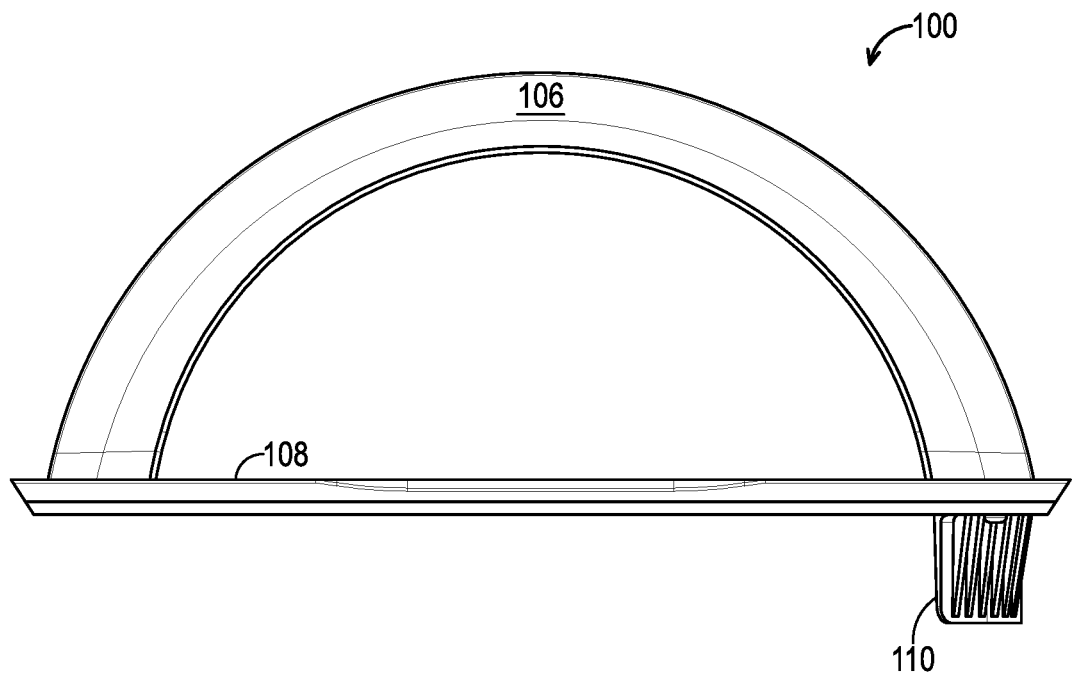
FIG. 9 is a first side elevation view of the fender of FIG. 2.
Figure 10:
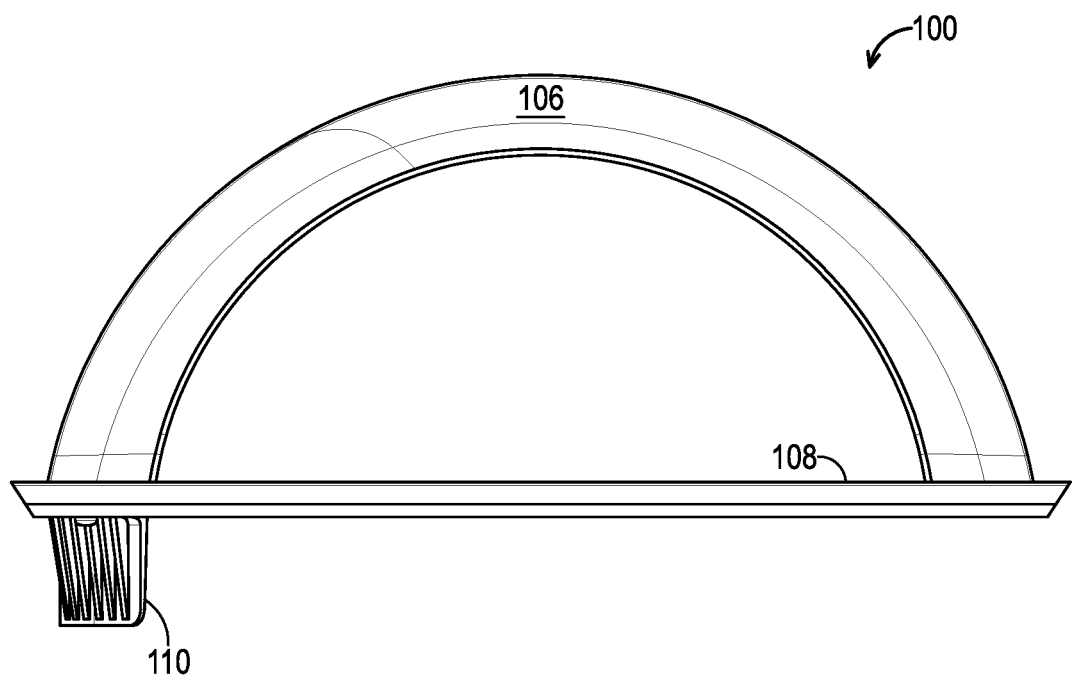
FIG. 10 is a second side elevation view of the fender of FIG. 2.
Figure 11:
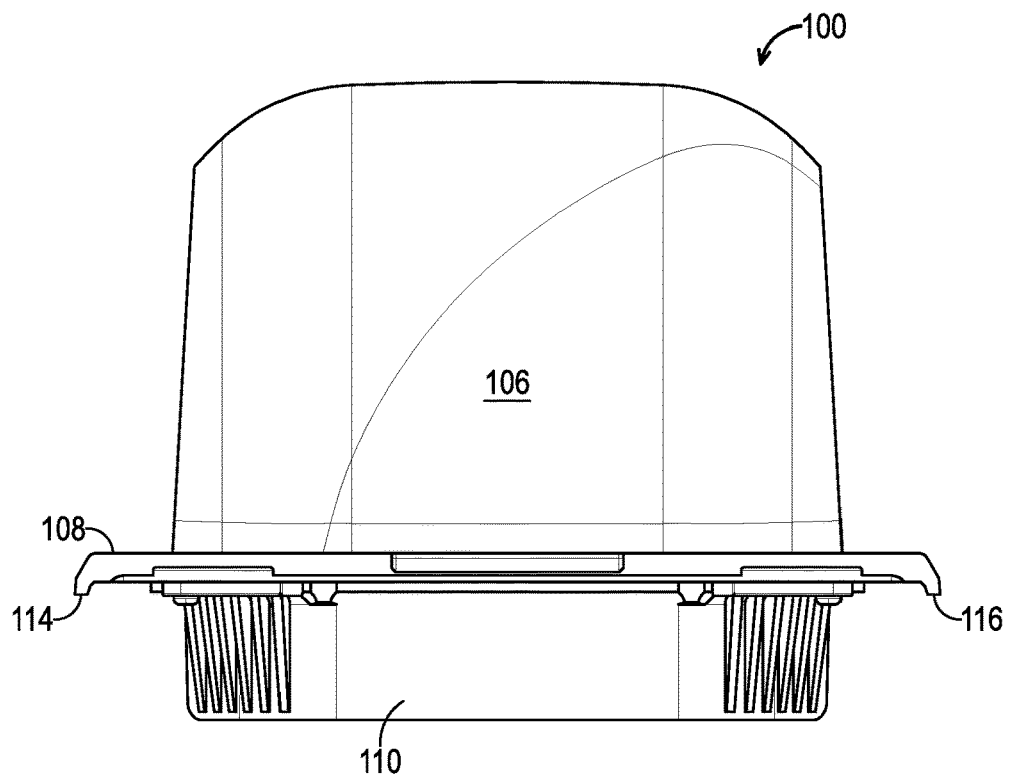
FIG. 11 is an elevation view of the first end of the fender of FIG. 2.
Figure 12:
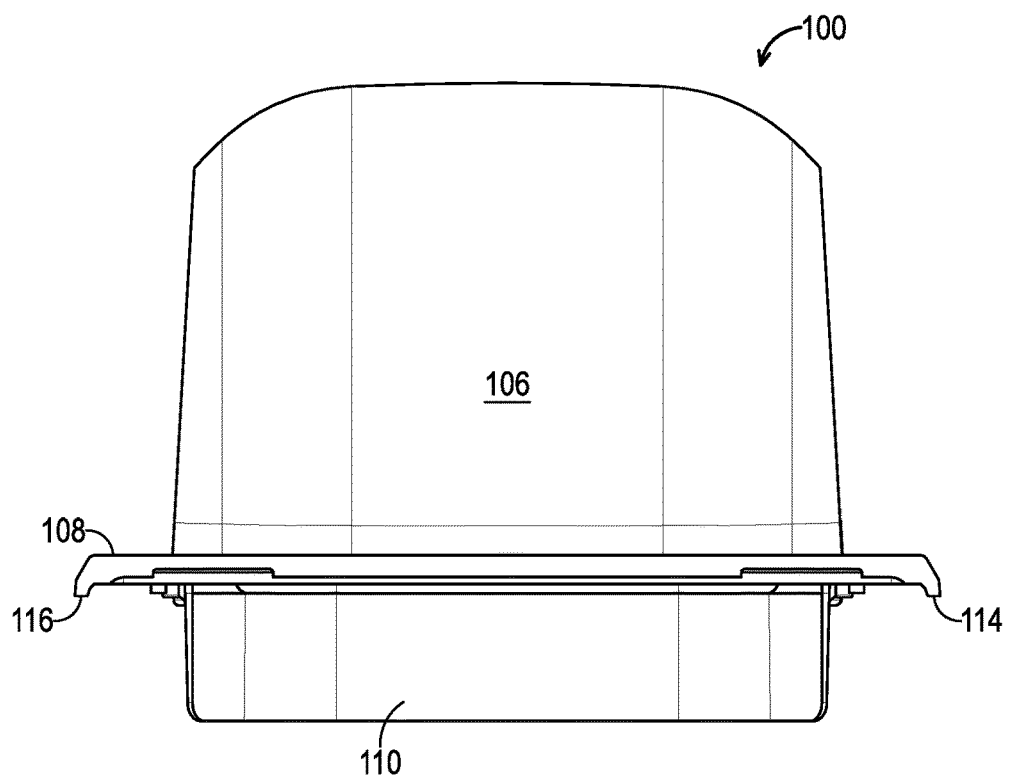
FIG. 12 is an elevation view of the second end of the fender of FIG. 2.
Figure 13:
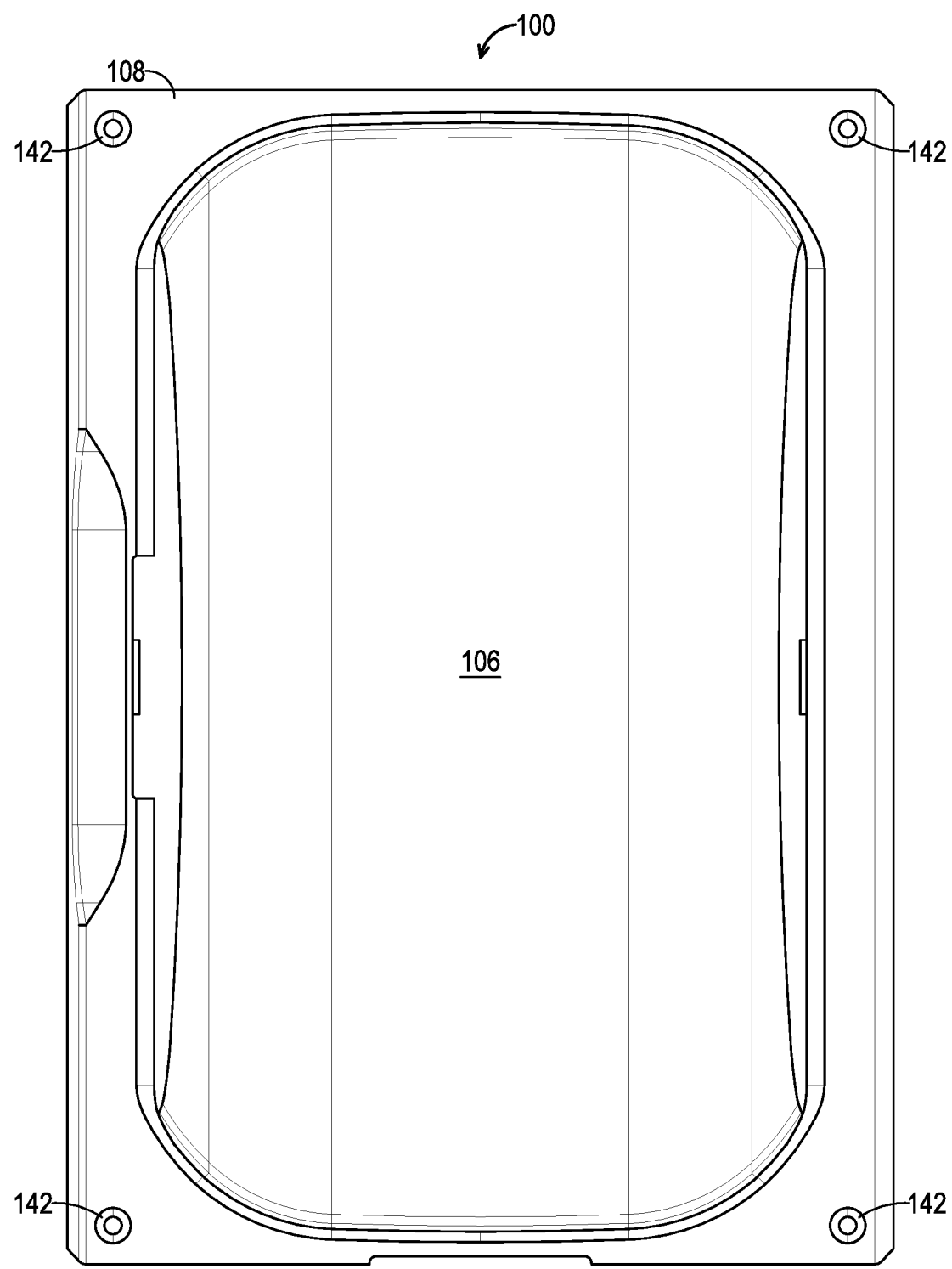
FIG. 13 is a top plan view of the fender of FIG. 2.
Figure 14:
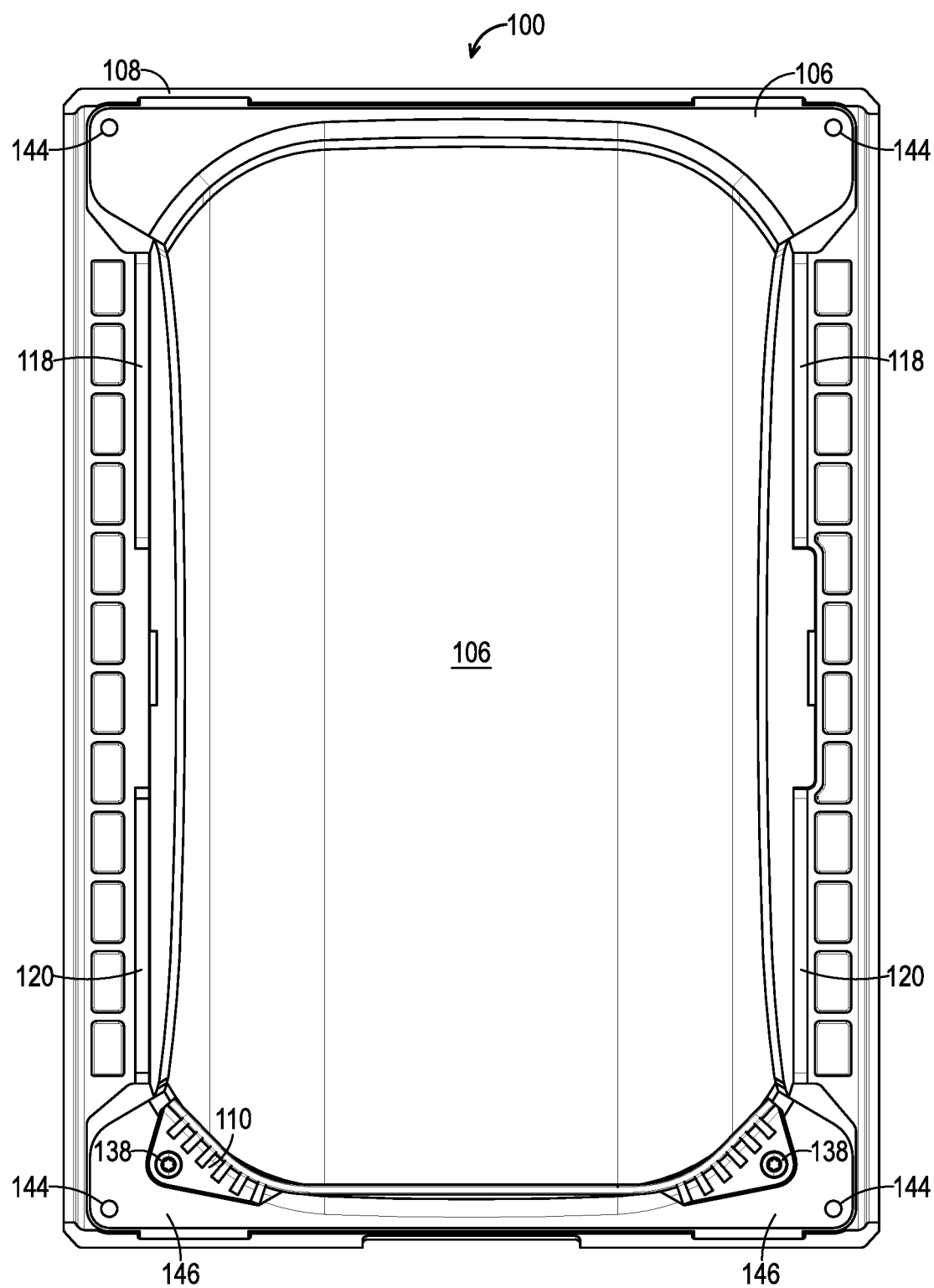
FIG. 14 is a bottom plan view of the fender of FIG. 2.
Figure 15:
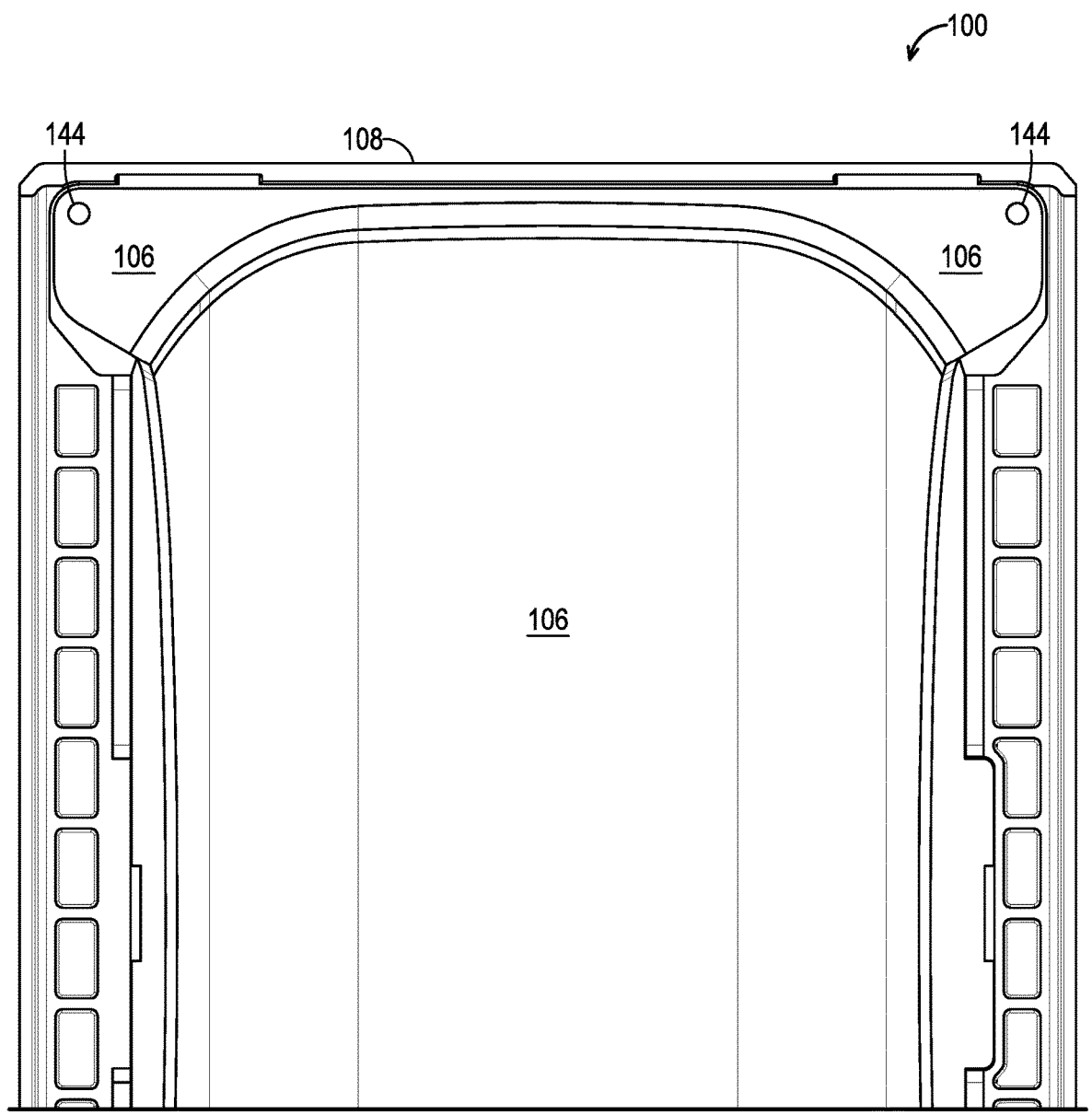
FIG. 15 is a magnified bottom view of the second end of the fender of FIG. 2.
Figure 16:
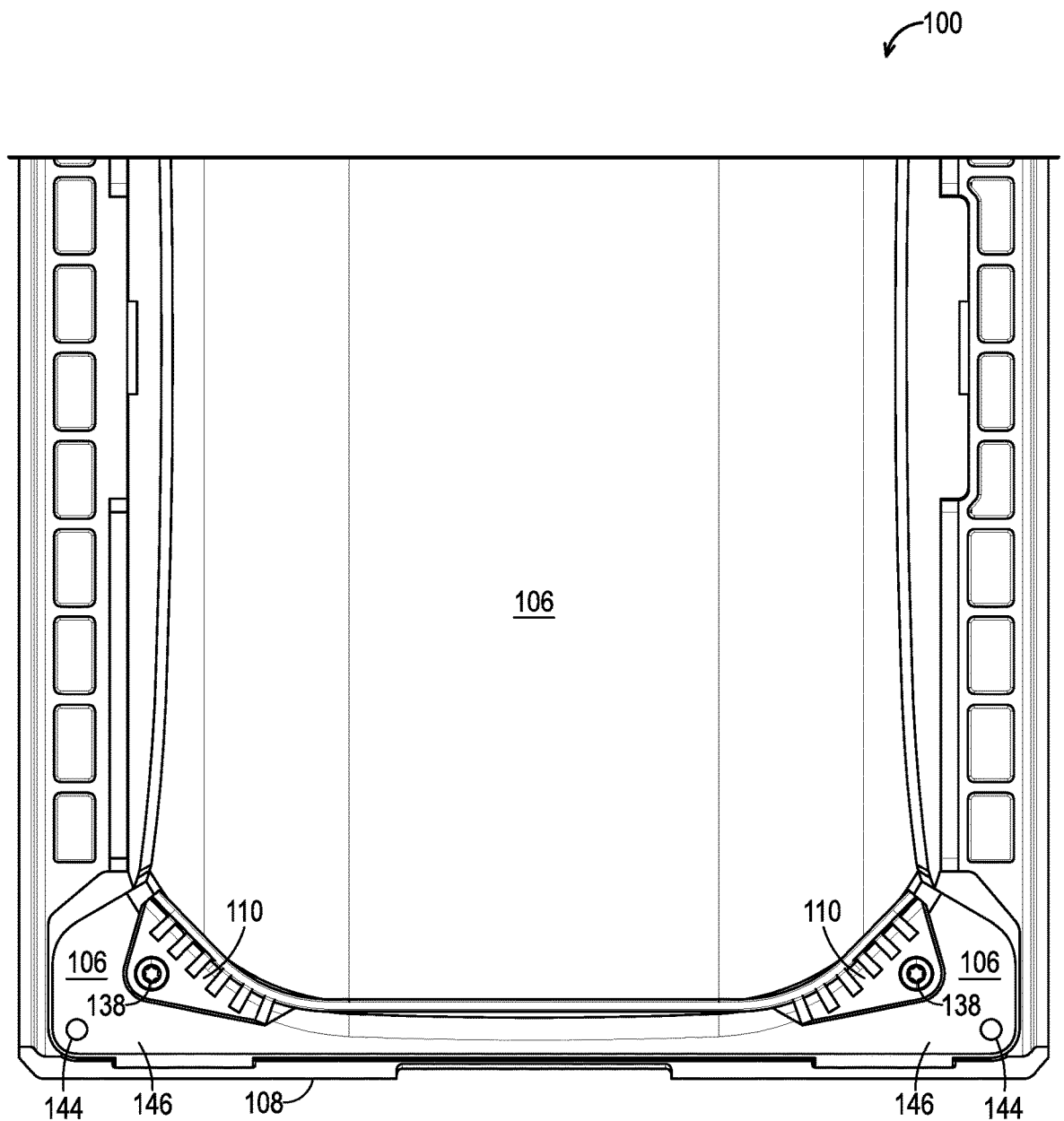
FIG. 16 is a magnified bottom view of the first end of the fender of FIG. 2.

FIGS. 7 and 8 depict the front and rear ends of the arch portion and peripheral frame, as assembled. As depicted, an interior edge of peripheral frame 108 is beveled, and the corner flanges of arch portion 106 pass under the peripheral frame.

The numbered paragraphs below describe additional aspects and features of fender assemblies for one-wheeled vehicles. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A fender assembly for a one-wheeled vehicle, the fender assembly comprising:
- a rectangular frame defining a central aperture, wherein a perimeter of the central aperture has a rounded-rectangle shape;
- an arcuate sheet terminating on either end at respective first and second flanges extending outward to form a planar base, wherein the arcuate sheet extends through the central aperture to a first side of the frame and the flanges abut a second side of the frame;
- a mud guard coupled to the rectangular frame through the first flange of the arcuate sheet, such that the mud guard extends from the first flange away from the second side of the frame.

A1. The fender assembly of A0, wherein the rectangular frame comprises a continuous rectangular annulus.

A2. The fender assembly of A0 or A1, wherein the arcuate sheet has a semicircular shape.

A3. The fender assembly of any one of paragraphs A0 through A2, wherein the arcuate sheet curves through 180 degrees.

A4. The fender assembly of any one of paragraphs A0 through A3, wherein the rectangular frame comprises a plastic material.

A5. The fender assembly of any one of paragraphs A0 through A4, wherein the arcuate sheet comprises a composite material.

A6. The fender assembly of A5, wherein the composite material comprises carbon fiber (CF).

A7. The fender assembly of any one of paragraphs A0 through A6, wherein a threaded fastener passes through an aperture in the mud guard into a threaded boss of the rectangular frame, and the boss is received by a through-hole of the first flange of the arcuate sheet.

A8. The fender assembly of any one of paragraphs A0 through A7, wherein a first plurality of apertures in corners of the rectangular frame register with a second plurality of apertures in the first and second flanges.

A9. The fender assembly of any one of paragraphs A0 through A8, wherein the rectangular frame comprises a respective ridge extending downward from each outboard edge of the frame.

B0. A fender assembly for a one-wheeled vehicle, the fender assembly comprising:
   an arch portion comprising a curved sheet of carbon fiber composite (CF) material having two opposing end portions, each end portion of the sheet extending outward to form a first and a second pair of corner flanges, such that the two pairs of corner flanges are coplanar;
   a peripheral frame comprising a ring of plastic defining an inner aperture and having four corner portions, wherein the peripheral frame is mated with the arch portion, such that the curved sheet passes through the inner aperture and each of the four corner portions of the peripheral frame is disposed atop a corresponding one of the corner flanges of the arch portion;
   a mud guard comprising a plastic skirt extending downward from one end of the peripheral frame, the mud guard having a pair of mounting surfaces; and
   a plurality of first fasteners securing the mounting surfaces of the mud guard to the corresponding corner portions of the peripheral frame, such that the first pair of corner flanges of the CF material arch portion are sandwiched between the mounting surfaces and the peripheral frame.

B1. The fender assembly of B0, wherein the peripheral frame comprises a single, continuous ring.

B2. The fender assembly of B0 or B1, wherein the peripheral frame comprises a generally rectangular annulus.

B3. The fender assembly of any one of paragraphs B0 through B2, wherein the peripheral frame is generally planar.

B4. The fender assembly of any one of paragraphs B0 through B3, wherein lateral edges of the curved sheet of carbon fiber are curved downward.

B5. The fender assembly of any one of paragraphs B0 through B4, wherein the curved sheet of carbon fiber is semicircular.

B6. The fender assembly of any one of paragraphs B0 through B5, wherein a pair of threaded bosses extend downward from the two of the four corner portions of the peripheral frame and are received through corresponding apertures in the corner flanges of the arch portion, such that each of the first fasteners passes up through an aperture in one of the mounting surfaces of the mud guard and is threaded into the corresponding boss.

B7. The fender assembly of any one of paragraphs B0 through B6, wherein the peripheral frame further comprises a pair of ridges on bottom outboard edges of the peripheral frame.

B8. A one-wheeled electric skateboard comprising the fender assembly of any one of paragraphs B0 through B7, wherein:
   the skateboard comprises a tiltable body having a central opening and a single wheel mounted to the tiltable body by an axle, such that the single wheel is disposed in the central opening; and
   wherein the fender assembly is coupled to a top surface of the tiltable body of the skateboard, such that the curved sheet of carbon fiber composite of the arch portion overarches the wheel.

B9. The skateboard of B8, wherein the peripheral frame further comprises a pair of ridges on bottom outboard edges of the peripheral frame, such that the ridges abut corresponding features of the tiltable body to space the peripheral frame from the top surface of the tiltable body.

B10. The skateboard of any one of paragraphs B8 through B9, wherein the curved sheet is oriented in a direction of travel of the skateboard.

B. Illustrative Method

This section describes steps of an illustrative method for installing a fender assembly on a one-wheeled electric skateboard. This method describes steps performed in an illustrative method, and may not recite the complete process or all steps of the method. Although various steps are described below, the steps need not necessarily all be performed, and in some cases may be performed simultaneously or in a different order than the order shown.

The method includes extending a curved portion of a fender arch through a central opening of a frame shaped as a rectangular annulus, such that first and second feet of the fender arch abut a lower surface of the frame.

The fender arch is secured to the frame by fastening a mud guard to the frame through the first feet of the fender arch. In some examples, fastening the mud guard includes inserting a fastener (e.g., a threaded fastener, such as a bolt or screw) through an aperture of the mud guard and into a boss of the frame. In some examples, the boss of the frame passes through a through-hole of the fender arch.

In some examples, the fender arch comprises a composite material, e.g., comprising carbon fiber. In some examples, the mud guard and/or the frame comprises a plastic, e.g., a molded plastic, e.g., injection-molded.

In some examples, the installation method further includes coupling the frame to a top surface of a one-wheeled electric skateboard, such that the fender arch extends over a wheel of the skateboard and the feet of the fender arch are trapped between the frame and the top surface of the skateboard.

The numbered paragraphs below describe additional aspects and features of methods for installing a fender assembly of the present disclosure on a vehicle. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

C0. A method of installing a fender assembly on a one-wheeled electric skateboard, the method comprising:

extending a curved portion of a fender arch through a central opening of a frame shaped as a rectangular annulus, such that first and second feet of the fender arch abut a lower surface of the frame;

securing the fender arch to the frame by fastening a mud guard to the frame through the first feet of the fender arch.

C1. The method of C0, wherein fastening the mud guard to the frame comprises inserting a fastener through an aperture of the mud guard and into a boss of the frame.

C2. The method of C1, wherein the boss of the frame passes through a through-hole of the fender arch.

C3. The method of any one of paragraphs C0 through C2, wherein the fender arch comprises a composite material.

C4. The method of C3, wherein the composite material comprises carbon fiber.

C5. The method of any one of paragraphs C0 through C4, wherein the frame comprises a plastic.

C6. The method of C5, wherein the frame comprises a molded plastic.

C7. The method of any one of paragraphs C0 through C6, wherein the mud guard comprises a plastic.

C8. The method of any one of paragraphs C0 through C7, further comprising coupling the frame to a top surface of a one-wheeled electric skateboard, such that the fender arch extends over a wheel of the skateboard and the feet of the fender arch are trapped between the frame and the top surface of the skateboard.

Advantages, Features, and Benefits

The different embodiments and examples of the fender assemblies described herein provide several advantages over known solutions. For example, illustrative embodiments and examples described herein provide a fender having reduced weight, with enhanced strength and appearance as compared with one-piece or all-plastic examples.

Additionally, and among other benefits, the multi-part assembly allows the easier formation of small details such as attachment features and the mudguard by having those portions comprise plastic. Very tight dimensional tolerances are possible in the plastic parts at low cost. Furthermore, assemblies of the present disclosure provide the impact resistance/toughness of injection molded plastic where it is helpful or needed, combined with the high overall strength of carbon fiber for the main wheel cover surface.

Additionally, and among other benefits, illustrative embodiments and examples described herein allow the carbon fiber portions to be quite thin compared to the plastic, which further reduces weight.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A fender assembly for a one-wheeled vehicle, the fender assembly comprising:

a rectangular frame defining a central aperture, wherein a perimeter of the central aperture has a rounded-rectangle shape;

an arcuate sheet terminating on either end at respective first and second flanges extending outward to form a planar base, wherein the arcuate sheet extends through the central aperture to a first side of the frame and the flanges abut a second side of the frame; and a mud guard coupled to the rectangular frame through the first flange of the arcuate sheet, such that the mud guard extends from the first flange away from the second side of the frame.

2. The fender assembly of claim 1, wherein the rectangular frame comprises a continuous rectangular annulus.

3. The fender assembly of claim 1, wherein the arcuate sheet has a semicircular shape.

4. The fender assembly of claim 1, wherein the arcuate sheet curves through 180 degrees.

5. The fender assembly of claim 1, wherein the rectangular frame comprises a plastic material.

6. The fender assembly of claim 1, wherein the arcuate sheet comprises a composite material.

7. The fender assembly of claim 6, wherein the composite material comprises carbon fiber (CF).

8. The fender assembly of claim 1, wherein a threaded fastener passes through an aperture in the mud guard into a threaded boss of the rectangular frame, and the boss is received by a through-hole of the first flange of the arcuate sheet.

9. The fender assembly of claim 1, wherein a first plurality of apertures in corners of the rectangular frame register with a second plurality of apertures in the first and second flanges.

10. The fender assembly of claim 1, wherein the rectangular frame comprises a respective ridge extending downward from each outboard edge of the frame.

11. A fender assembly for a one-wheeled vehicle, the fender assembly comprising:

an arch portion comprising a curved sheet of carbon fiber composite (CF) material having two opposing end portions, each end portion of the sheet extending outward to form a first and a second pair of corner flanges, such that the two pairs of corner flanges are coplanar;

a peripheral frame comprising a ring of plastic defining an inner aperture and having four corner portions, wherein the peripheral frame is mated with the arch portion, such that the curved sheet passes through the inner aperture and each of the four corner portions of the peripheral frame is disposed atop a corresponding one of the corner flanges of the arch portion;

a mud guard comprising a plastic skirt extending downward from one end of the peripheral frame, the mud guard having a pair of mounting surfaces; and a plurality of first fasteners securing the mounting surfaces of the mud guard to the corresponding corner portions of the peripheral frame, such that the first pair of corner flanges of the CF material arch portion are sandwiched between the mounting surfaces and the peripheral frame.

12. The fender assembly of claim 11, wherein the peripheral frame comprises a single, continuous ring.

13. The fender assembly of claim 11, wherein the peripheral frame comprises a generally rectangular annulus.

14. The fender assembly of claim 11, wherein the peripheral frame is generally planar.

15. The fender assembly of claim 11, wherein lateral edges of the curved sheet of carbon fiber are curved downward.

16. The fender assembly of claim 11, wherein the curved sheet of carbon fiber is semicircular.

17. The fender assembly of claim 11, wherein a pair of threaded bosses extend downward from the two of the four corner portions of the peripheral frame and are received through corresponding apertures in the corner flanges of the arch portion, such that each of the first fasteners passes up through an aperture in one of the mounting surfaces of the mud guard and is threaded into the corresponding boss.

18. The fender assembly of claim 11, wherein the peripheral frame further comprises a pair of ridges on bottom outboard edges of the peripheral frame.

19. A one-wheeled electric skateboard comprising the fender assembly of claim 11, wherein:
the skateboard comprises a tiltable body having a central opening and a single wheel mounted to the tiltable body by an axle, such that the single wheel is disposed in the central opening; and
wherein the fender assembly is coupled to a top surface of the tiltable body of the skateboard, such that the curved sheet of carbon fiber composite of the arch portion overarches the wheel.

20. The skateboard of claim 19, wherein the peripheral frame further comprises a pair of ridges on bottom outboard edges of the peripheral frame, such that the ridges abut corresponding features of the tiltable body to space the peripheral frame from the top surface of the tiltable body.

* * * * *